United States Patent
Taubman (10) Patent No.: US 6,658,159 B1
(45) Date of Patent: Dec. 2, 2003

(54) BLOCK ENTROPY CODING IN EMBEDDED BLOCK CODING WITH OPTIMIZED TRUNCATION IMAGE COMPRESSION

(75) Inventor: David S. Taubman, Pymble (AU)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/527,758

(22) Filed: Mar. 17, 2000

(51) Int. Cl.[7] .............................. G06K 9/36; G06K 9/46; H04N 7/12
(52) U.S. Cl. ..................... 382/240; 382/239; 382/247; 375/240.19
(58) Field of Search ............................. 382/240, 238, 382/237, 239, 246, 247, 248, 232; 341/50; 375/240.03, 240.19

(56) References Cited

U.S. PATENT DOCUMENTS 5,815,097 A  * 9/1998 Schwartz et al. .......... 341/51

2002/0080408 A1 * 6/2002 Budge et al. ............ 358/261.2

* cited by examiner

*Primary Examiner*—Wenpeng Chen (57) ABSTRACT

Embedded block entropy coding with optimized truncation is useful for image compression schemes in conjunction, for example, with a Wavelet transform, so as to form a bit-stream which can be stored or transmitted with increased efficiency. In the arithmetic coding phase, several opportunities exist for minimizing complexity and improving compression and computational performance as compared to existing systems. One method involves bypassing the arithmetic coding procedure for certain lower significance bit-planes of each code-block. Then, the raw binary digits from these bit-planes can be interleaved into the arithmetically coded bit-stream. As a result, both the average number of arithmetically coded symbols and the maximum number of coding passes per code-block can be significantly reduced.

8 Claims, 3 Drawing Sheets

BLOCK ENTROPY CODING IN EMBEDDED BLOCK CODING WITH OPTIMIZED TRUNCATION IMAGE COMPRESSION

FIELD OF THE INVENTION

The present invention relates to the field of digital image compression, and in particular to image compression based on embedded block coding with optimized truncation (EBCOT).

BACKGROUND OF THE INVENTION

Entropy or arithmetic coding is a form of data coding that can be used to compactly represent data, and may be used in one phase of an image compression algorithm. For example, a proposed image compression standard referred to as JPEG 2000 employs entropy coding as a final data coding process in an algorithm for still image compression. The JPEG 2000 algorithm is described, for example, in the Joint Photographic Experts Group JPEG 2000 Image Coding System document (ITU-T Rec. T.800 (1999 CDV1.0)/ISO/IEC CD15444-1: 1999(V1.0, Dec. 9, 1999)), the disclosure of which is incorporated herein by reference. The JPEG 2000 image compression system is used as a basis upon which to describe the operation of the present invention, and is thus introduced briefly hereinbelow.

Figure 1:
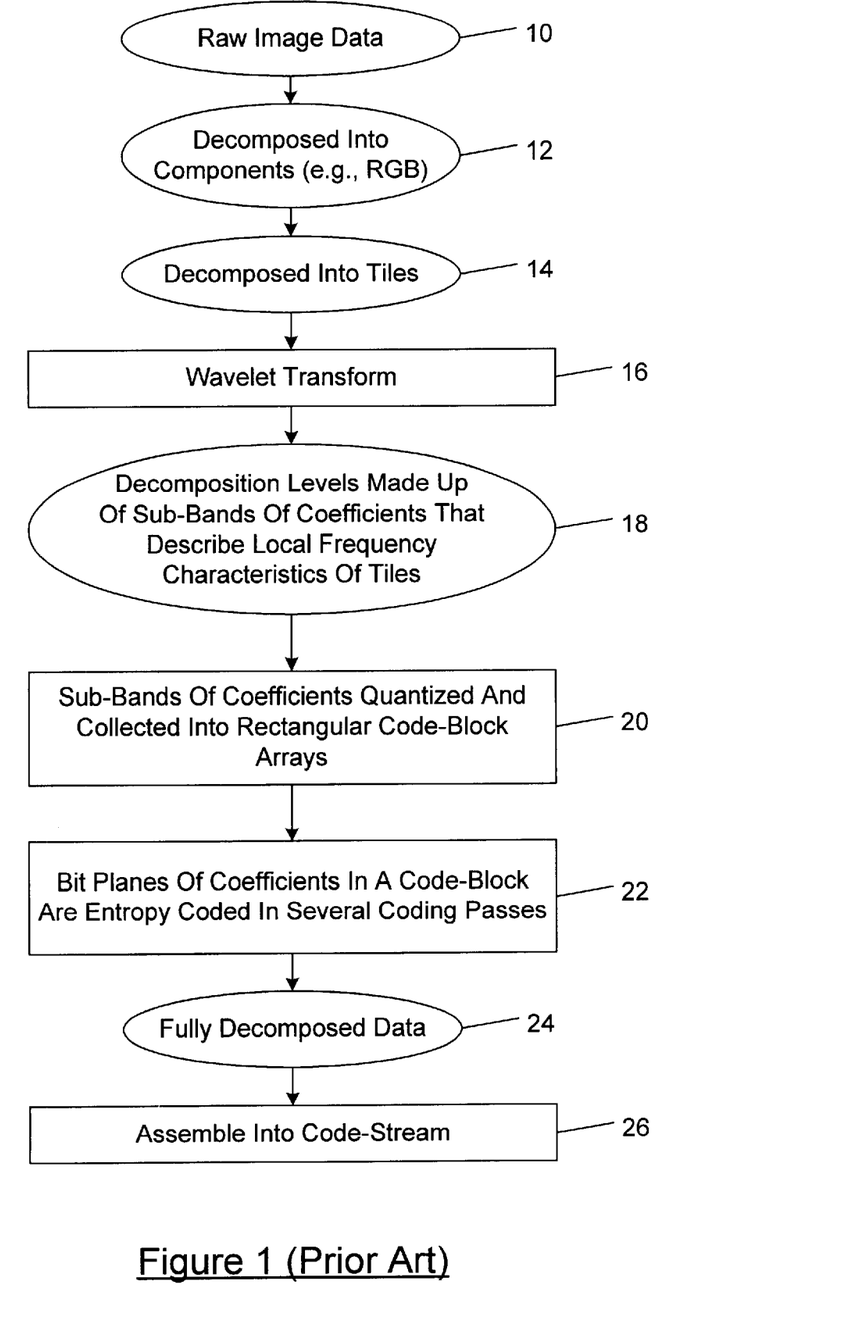
FIG. 1 is flowchart diagram illustrating the general procedure for encoding image data according to a proposed JPEG 2000 compression scheme.

Referring to FIG. 1, raw image data 10 to be compressed is first decomposed into components (step 12). For example, an image represented in an RGB color format may be decomposed into three separate color components. The image components are then each divided into tiles (step 14). The tiles are rectangular arrays applied in the same manner to each of the image components. The tile-components are further decomposed into different decomposition levels using a wavelet transform (step 16). The wavelet transform decomposition levels contain a number of sub-bands populated with coefficients that describe horizontal and vertical spatial frequency characteristics of the original tile-component planes (step 18). The coefficients provide local frequency information, and each wavelet decomposition level is related to the next decomposition level by spatial powers of two. In other words, each successive decomposition level of the sub-bands has approximately half of the horizontal and half of the vertical resolution as the previous level.

Even though there may be as many wavelet transform coefficients as original image samples, the information content following the wavelet transform tends to be concentrated into a relatively few coefficients. Using quantization, the information content can be further concentrated in the wavelet transform coefficients. Following quantization, the individual sub-bands of a tile component are divided into rectangular arrays of coefficients, referred to as code-blocks (step 20). The individual bit-planes of the coefficients in a code block are then entropy coded in three coding passes (step 22). Each of the coding passes collects contextual information about the bit-plane data and the arithmetic coder uses the contextual information and its internal state to generate coded data 24 that can then be formed into a compressed bit-stream (step 26).

SUMMARY OF THE INVENTION

It is desirable in some circumstances to reduce the complexity required of the arithmetic coding process, which can have some beneficial effects including reduced computational requirements for both encoding and decoding the data and thus reduced encoding/decoding time. One method described herein involves bypassing the arithmetic coding procedure for certain lower significance bit-planes of each code-block. Then, the raw binary digits from these bit-planes can be interleaved into the arithmetically coded bit-stream. As a result, both the average number of arithmetically coded symbols and the maximum number of coding passes per code-block can be significantly reduced.

In accordance with the principles of the present invention, there is provided a method for compressing image data in which the image data is decomposed into code-blocks of coefficients using a transform. Each code-block comprising a plurality of bit-planes from a most significant bit-plane to a least significant bit-plane. An encoded bit-stream is formed by coding bit-planes of coefficient data in the code-blocks according to an arithmetic coding scheme in order to form an encoded bit-stream, wherein coefficient data from at least one bit-plane is included in the encoded bit-stream without arithmetic coding.

The arithmetic coding scheme may operate in a plurality of coding passes, wherein at least one of the arithmetic coding passes for the coefficient data from the at least one bit-plane is not performed during the image data compression. For example, the coefficient data from bit-planes $$p < p_0 - K$$

may be written directly into the encoded bit-stream without arithmetic coding, wherein $p_0$ denotes the most significant bit-plane of the code block in which any sample therein becomes contextually significant during arithmetic coding and K is an integer parameter. In one preferred implementation of the invention K set equal to 3.

The present invention also provides an image data compression system having a decomposition processor which decomposes the image data into code-blocks of coefficients using a transform, each code-block comprising a plurality of bit-planes from a most significant bit-plane to a least significant bit-plane. An arithmetic coder is coupled to the decomposition processor, which forms an encoded bit-stream by coding bit-planes of coefficient data in the code-blocks according to an arithmetic coding scheme. The arithmetic coder is constructed such that coefficient data from at least one bit-plane is not subjected to said arithmetic coding scheme so as to be included in the encoded bit-stream without arithmetic coding.

The present invention further provides, in particular, a compressed image data bit-stream formed from transform coefficients of image data, wherein the bit-stream data structure includes arithmetically coded data interleaved with raw transform coefficient data.

BRIEF DESCRIPTION OF THE DRAWINGS

The invention is described in greater detail hereinafter, by way of example only, through description of a preferred embodiment thereof and with reference to the accompanying drawings in which.

DETAILED DESCRIPTION OF THE PREFERRED EMBODIMENT

A method and apparatus for improving entropy coding in an image compression system is disclosed herein. In the following description, for purposes of explanation, specific nomenclature and specific implementation details are set forth to provide a thorough understanding of the present invention. However, it will be apparent to one skilled in the art that these specific details are not required in order to practice the present invention. For example, the preferred embodiment is described in the context of an embedded block coding with optimized truncation (EBCOT) image compression system such as that of the proposed JPEG 2000 standard, but the techniques of the invention are equally applicable to arithmetic or entropy coding phases of other image compression systems and algorithms.

An outline of the proposed JPEG 2000 compression method is illustrated in flow-diagram form in FIG. 1.

Reduced Complexity Entropy Coding

In the following description, various complexity-performance considerations associated with the EBCOT block coding engine are described, relating to the JPEG Verification Model 4.0 (VM4). The EBCOT system is described, for example, in "Embedded Block Coding with Optimized Truncation", ISO/IEC JTC 1/SC 29/WG 1 document N 1020R, D. Taubman, Oct. 21, 1998, the contents of which are incorporated herein by reference and referred to as [WG1N1020R]. The JPEG VM4 contains two embedded block entropy coding engines: the original entropy coder from the EBCOT algorithm which provides the framework for VM4; and an "option" coder (described in document [WG1N1201] the content of which are also incorporated herein be reference), which provides an alternative, closely related entropy coding engine for the same framework. In some respects, the "option" coder involves some relatively minor modifications of the EBCOT entropy coder: elimination of one of the four EBCOT coding passes; and no transposition of code-blocks from the HL band. On the other hand, the "option" coder introduces some additional options which may have significant benefit to efficient hardware implementations: i.e. optional modes to enable parallel encoding and/or decoding and the possibility of implementations with reduced external memory consumption. The "option" coder also eliminated the use of sub-blocks within each code-block and the associated sub-block significance coder from the EBCOT algorithm. In fact the "option" coder was implemented by forcing the sub-block size in the EBCOT algorithm equal to the code-block size.

It has become apparent that the sub-block framework need not be eliminated in order to realise the benefits available from the various modes offered by the "option" coder. In fact, with the aid of sub-blocks, it should be possible to maintain a lower implementation complexity and/or CPU execution time, while reducing some of the performance penalty associated with the "option" coder. Specifically, the following description quantifies the impact of a variety of modifications and/or mode switches on the original EBCOT algorithm. This enables formation of a cohesive block-based entropy coding algorithm which possesses a superior range of complexity performance trade-offs to those which exist in VM4 referred to above.

Specifically, embodiments of the present invention are concerned primarily with minimizing the following three sources of complexity, while sacrificing as little as possible in compression performance:

a) The total number of symbols which must be arithmetically encoded/decoded per original image pixel. While this figure does embody all aspects of complexity, it does represent a substantial portion of the implementation cost, particularly for hardware solutions. This can be affected both by mechanisms which reduce the average number of symbols which must be coded, and mechanisms for reducing the maximum number of symbols which must be coded for any given sub-band sample.

b) Opportunities for parallelism. The independent block coding principle in EBCOT ensures that separate code-blocks can always be encoded/decoded in parallel, which can be referred to as "macroscopic" parallelism. This type of parallelism is ideally suited to software implementations on multi-processor architectures and provides a simple, if expensive, mechanism for increasing throughput in hardware implementations. In the following description opportunities for "microscopic" parallelism are also explored along the lines of the "option" coder [WG1N 1201], where the arithmetic coding contexts and codeword generation state variables are reset at the boundaries of each coding pass. This microscopic parallelism provides a mechanism for improving throughput without replicating the resources required to store multiple code blocks in local memory. Microscopic parallelism of this form is probably most relevant for efficient hardware implementations.

c) Elimination of redundant coding passes and/or coding contexts whose cost in terms of implementation complexity does not justify the small gains in compression performance which result.

As one might expect, the above goals lead to a family of trade-offs between performance and complexity and it is important to consider only the most compatible points in this complexity-performance trade off so as to ensure that hardware and software implementations can support the full range of trade-offs (probably with different throughputs and/or power consumption) with comparative ease.

It turns out that the sub-block coding paradigm in EBCOT is of some significant assistance in containing the number of symbols which must be coded and also practical CPU execution times, which is one of the reasons for its original introduction in the entropy coding engine in VM4. On the other hand, there have been some questions regarding whether or not the quad-tree approach to coding the sub-block significance information is appropriate for JPEG2000. For this reason, alternative approaches to coding the sub-block significance information are also investigated.

In discussing the various modifications made to the EBCOT entropy coder in the following section, some summary comparative results are also provided in terms of the following five images:

Lenna (512×512) This is included because it is the most common image used for comparing compression performance in journal papers and because it is a small image with which quick comparisons can be generated by others. It is not included in the test result averages.

Aerial2 (2048×2048) One of the four most commonly used JPEG2000 test images. This image rarely shows substantial performance differences between different entropy coding algorithms, mainly because it is so noisy that schemes to exploit structure in the image are relatively meritless. This image is no included in the test result averages because it invariably biases all entropy coding comparisons toward zero difference.

Bike (2048×2560) One of the four most commonly used JPEG2000 test images. This is included in the test result average.

Cafe (2048×2560) One of the four most commonly used JPEG2000 test images. This is included in the test result average.

Woman (2048×2560) One of the four most commonly used JPEG2000 test images. This is included in the test result average.

In the testing described hereinbelow, a 6-layer scalable mode is used with Daubechies 9/7 non-reversible filter kernels, and this mode will be familiar to those skilled in the art. It is obtained with the following compression options, "-prof sp -Clayers 0.0625 0.125 0.25 0.5 1.0 -rate 2.0", along with whatever other arguments are required to enable specific options for the test. It should be noted that the framework in which the present implementation has been made and the associated results is based on a pre-release of the VM4.1 software, rather than the actual VM4.1 release. There are two important differences between the code utilised as the basis for the present invention and VM4.1:

1) A difference in syntax introduced by Ricoh Company, Ltd which became mandatory with the final release of VM4.1. Using the pre-release version avoids the main difficulty with the newer syntax in that it does not easily allow new quantities to be recorded in the global header of the bit-stream for ease of experimentation.

2) The "option" coder was changed before the release of VM4.1 to use a different run-length coding method to that in the original EBCOT coder. The changed "option" coder utilises a so-called "speed up" mode that exploits properties of the arithmetic coding procedure (which has been modified accordingly) to encode and/or decode multiple symbols at a time under some circumstances. With the "speed up" mode, the primitives are not the same as the original EBCOT coder and the symbol counting procedure has been broken (symbols are not counted at all within the "run" mode). It is not clear how symbols should be counted in the run mode and for this reason in the present description it is preferred to rely upon the earlier incarnation of the "option" coder for the symbol count results presented herein.

A SEQUENCE OF MODIFICATIONS TO THE EBCOT CODER

Beginning with the EBCOT entropy coding engine from VM4 as described above, several variations to the entropy coding scheme are presented hereinbelow in terms of a sequence of modifications to the coder. In this way, the complexities of describing the entropy coder in detail can be avoided and only the differences from the coder described in [WG1N1020R] are actually identified here.

Preliminary Simplifications and Optimizations

As a beginning, it is possible to eliminate some of the less useful features of the EBCOT entropy coder which contribute somewhat toward complexity.

No "Far" Neighbours

Firstly, the so-called "Far Neighbourhood" context state can be eliminated, which is used by the zero coding primitive when all 8 immediate neighbouring samples within the code-block are insignificant, but one or more of the six neighbours which reside 2 samples to the left and/or right and within 1 sample vertically is already significant. This eliminates one of the 10 zero coding model contexts and reduces complexity somewhat. It has no apparent effect on software running time although it does introduce some simplifications for hardware implementations since the coding context now depends on 8 rather than 14 neighbours and there is one less context to be stored (contexts might need to be kept in very fast register storage, which is much more expensive than on-chip SRAM). The effect on signal-to-noise (PSNR) performance is on the order of about 0.01 dB and accordingly insignificant.

Reduction from 4 to 3 Coding Passes per Bit-Plane

The original EBCOT embedded block coder specifies 4 coding passes per bit-plane, designated as follows:

"Forward significance propagation pass", $P_i^{p,1}$

This pass is preserved as is, except that all sub-band samples for which any of the eight immediate neighbours have already been found to be significant are collected into this pass to compensate for removal of the reverse pass, below.

"Backward significance propagation pass", $P_i^{p,2}$

This coding pass is eliminated.

"Magnitude refinement pass", $P_i^{p,3}$

This pass is preserved as is.

"Normalization pass", $P_i^{p,4}$

This pass is preserved as is.

In all other respects, the description in [WG1N1020R] remains unchanged. The reason for dropping the reverse pass is that it contributes very little to overall compression performance with most images and adds to the implementation complexity and software running time (although not to the number of symbols which must be coded). It is also partly incompatible with the options discussed hereinbelow to increase opportunities for parallelism, although this can be circumvented by using a reverse scan only within sub-blocks, if it is considered sufficiently important. Experimental results of a comparison between the performance of VM4 and the modified coder obtained by removing the backward significance propagation pass and the "Far" neighbourhood context indicates a reduction in coded symbols per pixel for the modified coder of between 2.2% and 4.8% together with a generally reduced PSNR up to 0.06 dB.

No Block Transposition

In the original EBCOT entropy coder, each code-block from the HL sub-band (horizontally high-pass, vertically low-pass sub-band) is transposed so that both LH and HL code-blocks (the most significant) contain predominantly vertical edge features. This somewhat simplifies the implementation and testing in software and also reduces the complexity when the "Far Neighbourhood" context is in use. On the other hand, if the "Far" neighbourhood context is removed, as described above, this transposition step could do more harm than good to the overall complexity. More importantly, the transposition operation prevents deriving implementations with reduced external memory consumption as discussed further hereinbelow. The penalty for eliminating transposition is that the run-length coding mode in EBCOT may not respond so well to the HL sub-band's code-blocks so that poorer performance might be expected. However, experimental results indicate that the impact is in fact negligible.

Skewed Initialization for the Arithmetic Coder

The original EBCOT coder uses the default initial state for all context models in the conditional arithmetic coding process. Some benefit can be gained by initializing the run-length and all-zero contexts with appropriately skewed distributions, as was done for the option coder in [WG1N1201]. Also, for symbols with an assumed uniform distribution the MQ coder uses a separate context, which was inappropriately initialized in VM4. Nevertheless, preferential initialization of the arithmetic coder context states has the most substantial effect when the coder is restarted at the beginning of each coding pass as described hereinbelow in relation to parallel encoding/decoding. Taking the tuned initial states for this case and applying them to the coder with the modifications described in the previous three sections provides the starting point for a family of closely related coders which is developed in the following description. The initializations themselves are shown below. Experimental tests for the resulting coder indicates that the initializations which are tuned for independent coding passes have no substantial impact when the coding passes are not independent.

| | |
|---|---|
| Run-length coding context (for runs of four samples, all currently insignificant, with all neighbours of each sample currently insignificant) | MQ coder state 6 (Probability of "1" = 0.042; on the "learning curve") |
| All zero neighbourhood context (for samples which are currently insignificant, with all neighbours insignificant, which do not qualify as members of a run) | MQ coder state 8 (Probability of "1" = 0.020; on the "learning curve" |
| Assumed uniform context (for symbols which were coded without any adaptive context prior to the introduction of the MQ coder) | MQ coder state 28 (Probability of "1" = 0.34; not on the "learning curve") This context is re-initialized at the start of each coding pass |
| All other context models | MQ coder state 0 (Probability of "1" = 0.34; at start of "learning curve") |

Alternatives to Quad-Tree Coding of Sub-block Significance

In the original EBCOT algorithm the significance of each sub-block within a code-block is coded using a simple embedded quad-tree code. Here an alternative method is developed based on the techniques used for bit-plane coding. Specifically, at the beginning of each bit-plane, the arithmetic coding engine rather than a quad-tree code is used to signal the significance of each sub-block relative to that bit-plane. All of the sub-blocks in the code-block are simply scanned through in the usual lexicographical order, skipping over those sub-blocks which are already known to be significant and emitting a single binary symbol to identify the significance of each of the other blocks ("1" if it becomes significant, "0" otherwise). The symbol is coded in one of two different contexts as follows:

(i) If any of the four immediate neighbours (above, below, to the left or to the right) of the sub-block which lie within the same code-block have already been found to be significant, the "assumed uniform" coding context is used, which is re-initialized to the usual value (MQ coder state 28) at the beginning of the scan. It should be remembered that this context is re-initialized at the start of every coding pass, so reusing for the quad-tree code does not interfere with any of the other coding operations.

(ii) Otherwise, when all four immediate neighbours are still insignificant, a special coding context is used which is initialized to MQ coder state 4 (a slightly skewed state near the start of the "learning curve") at the commencement of the scan.

The bit-plane coding operations are interleaved into the bit-stream in exactly the same manner and sub-block significance has exactly the same interpretation as in the original EBCOT algorithm described in [WG1N1020R]. This algorithm is found to give essentially the same coding performance as the quad-tree coder, with a negligible PSNR improvement of between 0.01 dB and 0.02 dB (determined from comparative performance figures for the quad-tree coder and the so-called scan-subs coder in the default case of 16×16 sub-blocks and 64×64 code-blocks, as well as for the case of 8×8 sub-blocks and 64×64 code-blocks in which the sub-block significance code comprises a greater proportion of the overall bit-rate).

Options to Enable Parallelism

As with any block coder, it is always possible to compress or decompress any number of blocks in parallel and indeed this is most likely the easiest way to exploit parallelism. This can be referred to as macroscopic parallelism, because it does not require tight synchronization between the respective coding engines and can be realized in multi-threaded software implementations with comparative ease. A second opportunity for parallelism arises if the coding passes for any given block can also be performed in parallel. This is enabled if separate probability model contexts are maintained for each coding pass within each code-block. Of course, there is some additional adaptation overhead in this case, but that overhead is minimized by only visiting those sub-blocks which are known to be significant already. Moreover, it is necessary to terminate the arithmetic code word for each coding pass in such a way as to ensure that the decoder can recover the termination point implicitly during the decoding process and so know where each subsequent coding pass's bit-stream begins. This involves an average overhead of approximately 1.5 bits. Finally, in order to enable parallel decoding, as well as encoding, the length of the bit-stream segment corresponding to each coding pass must be explicitly identified, rather than implicitly determined by the decoding process itself and we must also restrict the non-causal context formation model used in the original EBCOT algorithm. These conditions and their solution are very similar to those associated with the "option" coder in VM4 [WG1N1201], with the following exceptions:

(i) There is no need to depart from the sub-block paradigm, as done in the "option" coder, or to entirely abandon the non-causal context models. Instead, a solution is obtained with higher compression performance and a reduced number of symbols to be arithmetically encoded/decoded by modifying the coder described above so that the coding contexts are "sub-block causal". That is, no sample in one sub-block may be coded with respect to a context formed using samples from a later sub-block in the lexicographical scan pattern. This affects the coding contexts only for those samples which lie on the lower and right hand boundaries of each sub-block. In fact, the modification is sufficiently minor that implementation does not need to invoke separate coding pass functions for this mode.

(ii) The arithmetic coder is also terminated and restarted at the beginning of each sub-block significance coding pass using the algorithm outlined above under the heading of alternatives to quad-tree coding of sub-block significance.

These modifications (sub-block causal context formation, restarting the arithmetic coder and re-initializing the context states at each coding pass, and markers to assist with parallel decoding) are currently envisaged as options for the bit-stream since they each involve some sacrifice in compression performance and the reward can only be realized in certain hardware implementations. Nevertheless, the modifications represent minor departures from the first member of the proposed family of entropy coders, i.e. that obtained by applying all the modifications discussed hereinabove. For convenience, the option to reset the context states and restart the arithmetic coder at each coding pass boundary will be hereinafter referred to as "-Crestart". The implications of these optional modifications are discussed below.

Implications for Parallelism

Consider some of the options for parallel decoding imparted by the sub-block causal coding context option. Parallel encoding relies only on the fact that the arithmetic coder is restarted on coding pass boundaries (i.e. "-Crestart"), although a parallel implementation might be substantially simplified by the sub-block causal coding contexts since then the encoder and decoder implementations can be virtually identical. Since the sub-blocks do not affect each other in a non-causal manner, it is possible to run parallel arithmetic coding engines in each sub-block, provided they are appropriately synchronized. Specifically, when the engine associated with the n'th sub-block in the scan completes a coding pass, it transfers its state and boundary conditions to the engine associated with the (n+1) 'th sub-block in the scan which then performs the same coding pass, while the engine associated with the n'th sub-block receives new state and boundary information from the engine for the (n−1)'th sub-block in the scan. This is only one of a number of parallel implementation options, but is perhaps the easiest to understand. It should be noted that a parallel decoder must decode the sub-block significance information for all bit-planes (or all those to be executed in parallel) in a sequential manner before the parallel decoding of the sub-bit-plane passes can commence. This presents no problem since the sub-block significance coding process is remarkably simple and operates on vastly less data than the regular coding passes.

Opportunities for Memory Reduction

In applications where external memory and memory bandwidth are at a premium and the application supplies or consumes the image in a line-by-line fashion, perhaps the most reasonable approach is to use a "K"-line transform implementation which produces K lines of each sub-band in any given resolution level in a swath, storing LL band samples back to memory until enough have been accumulated to run the transform over the same "K"-line transform over the LL band and so on in a recursive manner, as explained in [WG1N1020R]. Larger values of K imply lower overall memory access bandwidth, since the cost of accessing the samples in the filter's vertical region of support is amortized over the larger number of lines being produced simultaneously. When working with the generic block coding engine, the most memory and bandwidth efficient solution is to set K equal to the block height (e.g. 32 or 64 rows—note that code-blocks need not be square), as discussed carefully in [WG1N1020R]. It is possible to reduce the value of K down to the height of a single sub-block (say 8 or 16 rows), without substantially increasing memory bandwidth, provided the sub-bit-plane coding passes use independent probability models ("-Crestart"), as also advocated in [WG1N1201]. This is by no means easy to understand, particularly since a variety of different implementations are enabled.

The basic idea is that the coder would process a row of sub-blocks within the current row of code-blocks, within any given pass of the K-line transform, where K is set equal to the block height (it is also possible to set K to any multiple of the sub-block height, but we will not consider that here). This is illustrated diagramatically in FIG. 2 of the accompanying drawings. All sub-bit-plane coding passes must be implemented in parallel (at least conceptually), and at each code-block boundary (in the horizontal direction) the state of these coding engines must be flushed out to memory, to be retrieved later in the next K-line pass where the next row of sub-blocks in the same set of horizontally adjacent code-blocks is visited. In this process, the significance of the various sub-blocks can be saved to external memory along with the other context and arithmetic coder state information, on horizontal block boundaries, so that the sub-block significance coding process can be executed later, after all sub-block high scans of the code-block have been completed. At this point, the embedded bit-stream for the code-block is also pieced together, from the disjoint pieces corresponding to each coding pass and each sub-block significance scan. In the decoder, the process is reversed.

Figure 2:
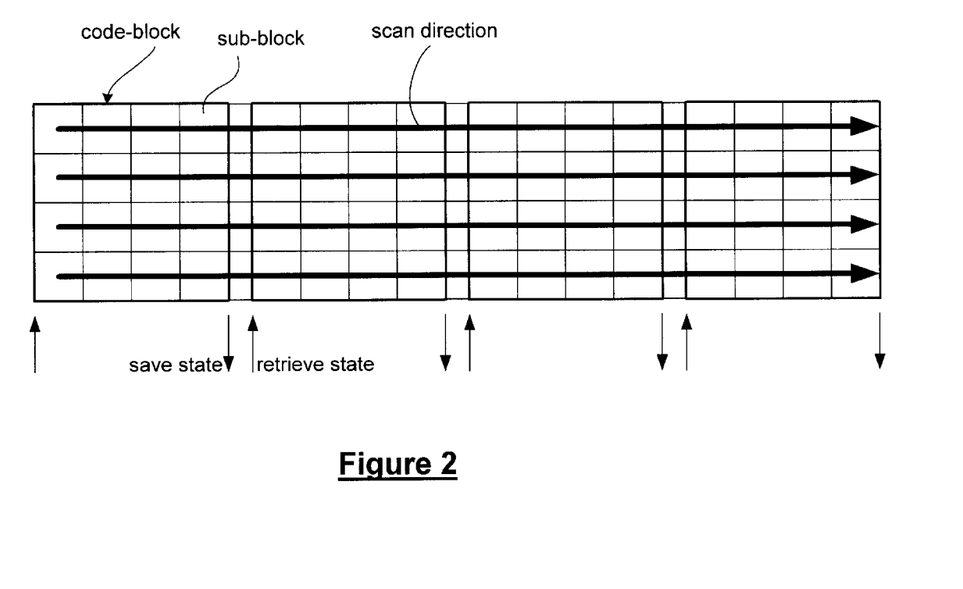
FIG. 2 is a diagrammatic illustration of a row of code blocks.

In FIG. 2, a row of code-blocks is illustrated, coded in increments of K lines at a time, where K is equal to the sub-block height. In the figure, there are only 4×4 sub-blocks per code-block. The state of the arithmetic coders for each sub-bit-plane pass must all be flushed out and retrieved at the boundary of each code-block in the horizontal scanning direction and the significance of each sub-block must also be saved externally, although the latter involves negligible memory and bandwidth.

This process of maintaining, flushing and retrieving large amounts of state information on horizontal code-block boundaries is not necessarily simple and might prove prohibitive in some applications. Nevertheless, the possibility exists to reduce external memory requirements in this way. In practice, it is most likely that memory savings will be achieved, if desired, by code-blocks which are only a single sub-block high (e.g. 8 or 16 rows) and comparatively wide (e.g. 128 or 256 columns). In this case there is no need to flush the state of many parallel arithmetic coding engines to external memory and the entire code-block bit-stream can be assembled on-chip, which is conceptually and practically somewhat easier. It may also be preferred to use the parallel options (independent probability models for each coding pass and sub-block causal context formation) even though it has no effect on external memory requirements, in order to reduce on-chip memory requirements. Specifically, with independent probability models for each coding pass and sub-block causal context formation, it is possible to avoid buffering up the code-block samples beyond the width of a sub-block, which is generally much less than the width of a code-block, particularly if very wide blocks are used to compensate for reductions in block height down to that of a single sub-block.

Rather than using the parallel options solely to reduce external or internal memory requirements, it is possible that these options are most useful for achieving microscopic parallel encoding and/or decoding for "sample-per-clock" applications in which very high throughput is essential. When used in this way, the memory savings may be seen as an added bonus, particularly when working with wide code-blocks whose height is only that of a single sub-block, since in that case the substantial state information need not be repeatedly stored and retrieved from external memory, as mentioned above. It should also be noted that the memory savings will not be available if the image is to be transposed for one reason or another by decoding and inverse transforming (or forward transforming and encoding) code-blocks in a column by column, rather than row-by-row fashion. They are also not available in the so-called "block-based" applications which have been strongly advocated for digital camera applications. This may be important to some envisaged printing mechanisms.

Performance Loss

Experimental testing of the parallel processing options discussed above have been carried out based on 64×64 code-block size and both 8×8 and 16×16 sub-blocks. Two different sub-block sizes were examined because the size of the sub-block affects the degree of parallelism and the potential for external memory savings. The results relate to the case in which sub-block causal contexts are combined with the "-Crestart" option. This is the most interesting case since it allows both parallel encoding and parallel decoding. To support parallel decoding it would also be necessary to add markers into the bit-stream to identify the start of each coding pass, however the cost of this is identical to the cost of adding markers for the "option" coder in VM4 and other variations on the same theme. In fact, provided the sub-block causal contexts are used and the arithmetic coding process is restarted at the beginning of each coding pass, it is always possible to discard and later regenerate the markers without interfering with the rest of the bit-stream.

In the case of 16×16 sub-blocks with 64×64 code-blocks, the number of symbols coded per pixel for the pictures referred to hereinabove and at various bit-rates was found to decrease using the parallel option by between by between 0.8% and 4.0%, with an average of about 1.8%. A decrease in signal-to-noise ratio was also found, of between 0.03 dB and 0.14 dB, averaged to about 0.08 dB. In the case of an 8×8 sub-block size, the symbol usage metric was found to decrease by between 0.8% and 4.1% (av.~2.3%), with a decreased PSNR between 0.04 dB and 0.17 dB (av.~0.11 dB).

Comparison of Sub-Block Based vs. Line Based Block Coding

It is worthwhile comparing two somewhat different approaches to incorporating parallel encoding/decoding capabilities into the block-based entropy coder. The first approach, embodied in the "option" coder within VM4 and described in [WG1N1201], uses a line-based scan pattern within the code block and line-causal context formation in order to enable parallel decoding. The second approach described in this document, codes the samples sub-block by sub-block and uses sub-block causal context formation in order to enable parallel decoding. Experimental testing comparing the compression performance and number of symbols retrieved from the arithmetic coder per image pixel for the two approaches, using sub-block sizes of 16×16 and 8×8, indicate the following:

1) The use of sub-blocks implies a significant reduction in the number of samples which must be visited and coded/decoded during the sub-bit-plane coding passes, particularly at lower bit-rates. This in turn implies speed up and/or power reduction in software and hardware implementations.
2) The use of sub-blocks reduces the adaptation overhead of the bit-plane coding probability models somewhat, which may have a small positive impact on compression efficiency. Moreover, there is no need to restrict the context formation to vertically causal contexts in the sub-block based approach. The only modification to contexts is at the lower and right hand sub-block boundaries, which affects only a small proportion of the samples, particularly for larger sub-block sizes. Consequently, loss of compression performance due to the restriction to causal contexts is reduced. The combination of these two effects is evidenced by the results which indicate that the sub-block based approach loses only about half as much (in dB) relative to the original EBCOT coder in VM4 as does the line based approach of the "option" coder. For 8×8 sub-blocks, performance is closer to that of the line based approach, but the reduction in symbol count is also larger—about 30% at bit-rates of interest.
3) If the parallel options are used to reduce memory consumption, in one of the ways described hereinabove, then there is no need to buffer K lines of samples across the full code-block width before anything can be coded as is the case with line-based block coding. Instead, it is sufficient to buffer samples for only the width of a single sub-block on-chip, which can represent a substantial saving, particularly when working in the most realistic memory saving mode in which the code-blocks are only a single sub-block high, but relatively wide (say 128 or 256 columns). For this most realistic case, the "option" coder in VM4 provides an alternative "column-by-column" scanning option for precisely this reason, whereas the sub-block based coder described herein accomplishes a similar effect without introducing a different scanning pattern.
4) A disadvantage of the sub-block based approach is that it restricts the opportunity to realize reduced external memory implementations to the cases in which the number of lines processed at a time is a multiple of the sub-block height. However, already mentioned, this may not in practice be a highly utilized capability for a variety of reasons. Also, a sub-block height of 8 would probably be small enough to achieve most of the useful gain from such schemes without substantially increasing the memory bandwidth.

A Lazy Coding Mode

The preceding description has concentrated on achieving properties such as parallel encoding/decoding while minimizing the average number of symbols to be coded/decoded. In the following, a coder structure is described which both reduces the average number of arithmetically coded symbols and also reduces the maximum number of coding passes in which symbols might need to be arithmetically coded, which can be of advantage in simplifying hardware implementations.

By observing the probability models for different coding contexts it can be noticed that many attain distributions close to uniform in the least significant bit-planes. It may be considered a waste of effort to use the arithmetic coding engine to code these binary symbols, and instead it may be preferred to send them as raw binary digits. Although it is difficult to interleave raw binary digits into an arithmetically coded bit-stream, it is possible to bypass the arithmetic coding engine altogether for an entire sub-bit-plane coding pass provided the arithmetic coder is terminated at the end of the previous coding pass (using the Elias termination which allows for unique decoding with arbitrary bit-stream suffices) and restarted at the beginning of the next pass which requires arithmetic coding. This is a subset of the behaviour offered by the "-Crestart" option described above without the costly re-initialization of coding context states which goes with the "-Crestart" mode. However, it is preferred to use this "lazy" mode only in conjunction with "-Crestart" and sub-block causal contexts for reasons explained below.

To be specific, in this form of arithmetic coder all of the binary symbols generated in the "significance propagation" and "magnitude refinement" coding passes (referred to earlier) representing bits in bit-planes $p<p_0-K$ are written directly into the bit-stream as raw binary digits, entirely bypassing the arithmetic coder. Here $p_0$ denotes the most significant bit-plane in which any sample in the relevant code-block becomes significant and K is an integer parameter. In a preferred form of the present invention and in the context of the embodiment described herein, the parameter K can be conveniently set to K=3.

Figure 3:
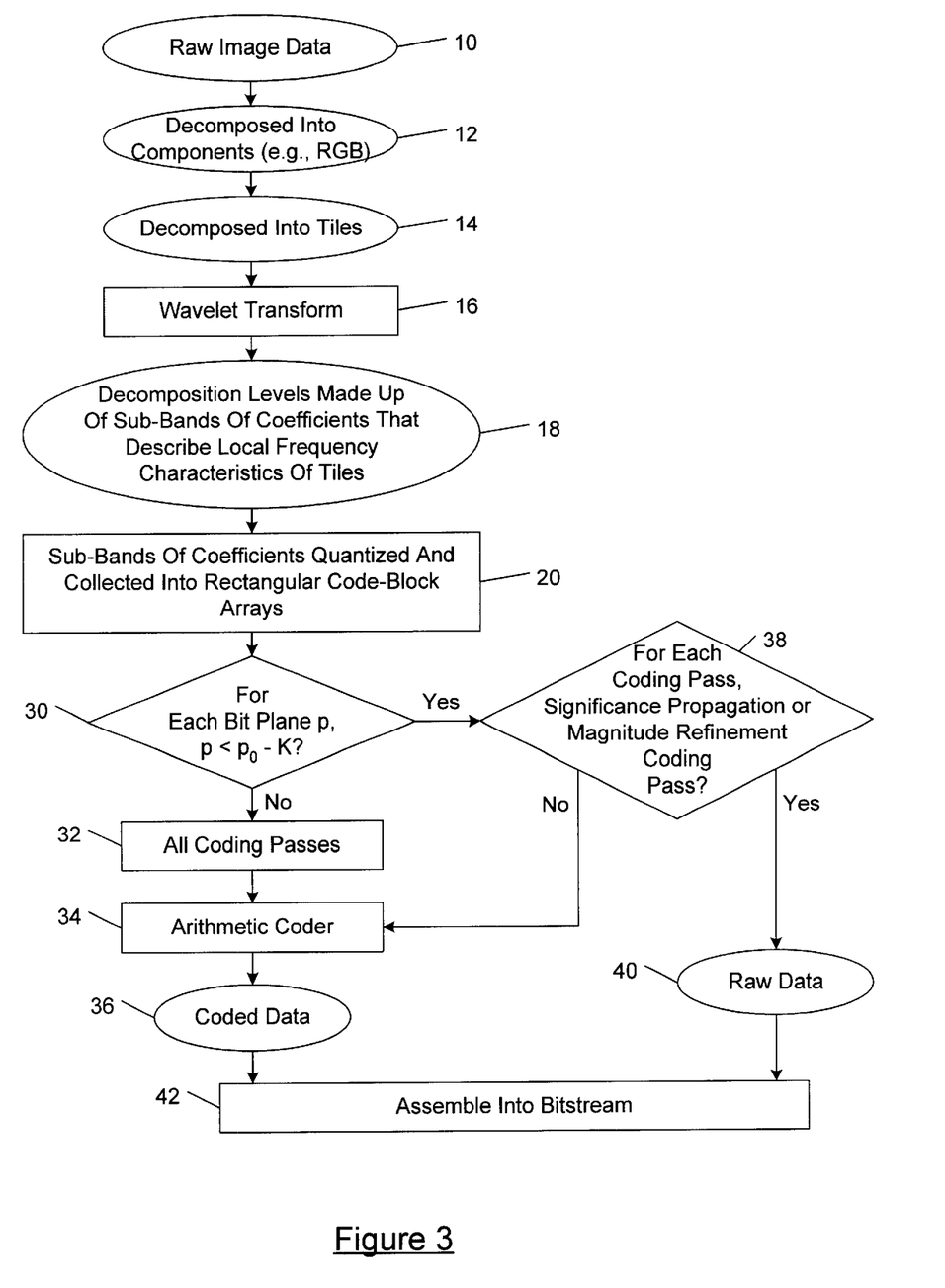
FIG. 3 is a flow diagram of an embodiment of a method of encoding image data in which coefficient data from at least one bit-plane is included in an encoded bit-stream without arithmetic coding.

Referring to FIG. 3, in one embodiment, raw image data 10 to be compressed is first decomposed into components (step 12). For example, an image represented in an RGB color format may be decomposed into three separate color components. The image components are then each divided into tiles (step 14). The tiles are rectangular arrays applied in the same manner to each of the image components. The tile-components are further decomposed into different decomposition levels using a wavelet transform (step 16). The wavelet transform decomposition levels contain a number of sub-bands populated with coefficients that describe horizontal and vertical spatial frequency characteristics of the original tile-component planes (step 18). The coefficients provide local frequency information, and each wavelet decomposition level is related to the next decomposition level by spatial powers of two. In other words, each successive decomposition level of the sub-bands has approximately half of the horizontal and half of the vertical resolution as the previous level.

Even though there may be as many wavelet transform coefficients as original image samples, the information content following the wavelet transform tends to be concentrated into a relatively few coefficients. Using quantization, the information content can be further concentrated in the wavelet transform coefficients. Following quantization, the individual sub-bands of a tile component are divided into rectangular arrays of coefficients, referred to as code-blocks (step 20). The individual bit-planes of the coefficients in a code block are then entropy coded in three coding passes. Each of the coding passes collects contextual information about the bit-plane data. If a bit plane p corresponds to one of the more significant bit planes satisfying the conditions $p \geq p_0 - K$ (step 30), the bit plane undergoes all coding passes (step 32). The data generated during each coding pass is passed to the arithmetic coder 34, which uses the contextual information and its internal state to generate coded data 36 that can then be formed into a compressed bit-stream 42. For a bit plane p corresponding to the less significant bit planes satisfying the condition $p < p_0 - K$ (step 30), all of the binary symbols generated in the significance propagation and magnitude refinement coding passes (step 38) are written directly into the bit stream 26 as raw binary bits 40, entirely bypassing the arithmetic coder 34. Only the binary symbols generated during the normalization coding pass are passed to the arithmetic coder 34.

An additional modification to the Elias termination procedure can be employed in order to ensure that the "lazy" mode can be used in conjunction with the MQ coder. Specifically, since the MQ coder is byte-oriented, with a bit-stuffing rather than carry propagation policy for dealing with carry generation at the encoder, the arbitrary bit-stream suffices which can be generated by the emission of raw uncoded bits can generate illegal bit-stream for a previous MQ-coded pass. To avoid this difficulty, the Elias termination implementation should be modified to allow for truly arbitrary suffices.

The "lazy" coding method has several advantageous effects. One advantage is that it substantially reduces the number of symbols which must be arithmetically coded at high bit-rates. Since it is usual to encode all code-blocks in an image at a high rate before truncating down to a final target bit-rate, this scheme substantially reduces the number of symbols which must typically be encoded and hence reduces the encoding time. Experimental results indicate, for example, that CPU times for reversible compression are typically reduced by 30%. On the other hand, the "lazy" coding method has relatively little effect on compression performance.

The second advantage of the "lazy" coding method is that it substantially reduces the maximum number of coding passes in which arithmetic coding might need to be used. Without the modification, the maximum number of coding passes for any given code-block in an EBCOT coder is $3P_{max}-2$, where $P_{max}$ is the maximum number of bit-planes in any given sub-band which might be of the order of 12 for the lower frequency sub-bands. On the other hand, using the "lazy" coding method, the maximum number of coding passes for any given code-block is $P_{max}+2K=P_{max}+6$ (for K=3). In applications where microscopic parallelism is intended to achieve "sample-per-clock" throughput, this means a substantial reduction in the number of parallel arithmetic coding engines which must be included on a coding chip.

Table 1 shown below indicates experimental performance figures for the combination of this so-called "lazy" option with the "-Crestart" option and sub-block causal coding contexts, comparing the performance with the use of sub-block causal coding contexts and "-Crestart" alone. In particular, Table 1 shows a comparison of the "lazy coding" option in combination with the parallel options with the parallel options alone, for a sub-block size of 16×16 and a code-block size of 64×64.

TABLE 1

| Par bpp | Par Symbols | Par PSNR | Lazy bpp (+/− %) | Lazy Symbols (+/− %) | Lazy PSNR (+/− dB) |
|---|---|---|---|---|---|
| | | | Lenna (512 × 512) | | |
| 0.06226 | 0.088 | 28.09 | 0.06223 (−0.0) | 0.085 (−3.6) | 28.09 |
| 0.12491 | 0.179 | 30.97 | 0.12491 | 0.167 (−7.0) | 30.96 (−0.00) |
| 0.24924 | 0.362 | 34.04 | 0.24970 (+0.2) | 0.310 (−14.2) | 33.99 (−0.05) |
| 0.49988 | 0.715 | 37.21 | 0.49973 (−0.0) | 0.580 (−18.8) | 37.14 (−0.07) |
| 0.99878 | 1.367 | 40.32 | 0.99966 (+0.1) | 1.041 (−23.9) | 40.28 (−0.04) |
| 1.99792 | 2.500 | 44.80 | 1.98401 (−0.7) | 1.731 (−30.8) | 44.75 (−0.05) |
| | | | Aerial 2 (2048 × 2048) | | |
| 0.06221 | 0.090 | 24.60 | 0.06203 (−0.3) | 0.80 (−10.7) | 24.59 (−0.00) |
| 0.12477 | 0.184 | 26.48 | 0.12472 (−0.0) | 0.164 (−11.2) | 26.49 (+0.00) |
| 0.24984 | 0.345 | 28.54 | 0.24991 (+0.0) | 0.304 (−12.0) | 28.54 (+0.01) |
| 0.49954 | 0.669 | 30.60 | 0.49966 (+0.0) | 0.585 (−12.5) | 30.60 (+0.00) |
| 0.99905 | 1.297 | 33.21 | 0.99906 (+0.0) | 1.089 (−16.0) | 33.23 (+0.01) |
| 1.99660 | 2.430 | 38.04 | 1.99556 (−0.1) | 2.008 (−17.4) | 38.08 (+0.04) |
| | | | Bike (2048 × 2560) | | |
| 0.06249 | 0.116 | 23.75 | 0.06248 (−0.0) | 0.111 (−4.3) | 23.74 (−0.01) |
| 0.12475 | 0.220 | 26.28 | 0.12486 (+0.1) | 0.204 (−7.3) | 26.24 (−0.04) |
| 0.24999 | 0.421 | 29.53 | 0.24987 (−0.0) | 0.377 (−10.5) | 29.46 (−0.07) |

TABLE 1-continued

| Par bpp | Par Symbols | Par PSNR | Lazy bpp (+/− %) | Lazy Symbols (+/− %) | Lazy PSNR (+/− dB) |
|---|---|---|---|---|---|
| 0.49958 | 0.797 | 33.40 | 0.49997 (+0.1) | 0.680 (−14.7) | 33.28 (−0.12) |
| 0.99840 | 1.477 | 37.96 | 0.99921 (+0.1) | 1.166 (−21.1) | 37.80 (−0.16) |
| 1.99778 | 2.706 | 43.91 | 1.99976 (+0.1) | 1.844 (−31.9) | 43.75 (−0.16) |
| | | | Café (2048 × 2560) | | |
| 0.06249 | 0.098 | 19.03 | 0.06237 (−0.2) | 0.096 (−2.9) | 19.02 (−0.00) |
| 0.12491 | 0.205 | 2073 | 0.12490 (−0.0) | 0.200 (−2.8) | 20.73 (+0.00) |
| 0.24986 | 0.388 | 23.07 | 0.24999 (+0.1) | 0.378 (−2.8) | 23.07 (+0.00) |
| 0.49984 | 0.737 | 26.71 | 0.49993 (+0.0) | 0.694 (−5.9) | 26.70 (−0.01) |
| 0.99934 | 1.417 | 31.89 | 0.99976 (+0.0) | 1.255 (−11.4) | 31.85 (−0.04) |
| 1.99819 | 2.646 | 38.92 | 1.99956 (+0.1) | 1.931 (−27.0) | 38.85 (−0.07) |
| | | | Woman (2048 × 2560) | | |
| 0.06233 | 0.091 | 25.59 | 0.06243 (+0.2) | 0.087 (−4.0) | 25.59 (−0.00) |
| 0.12426 | 0.184 | 27.32 | 0.12459 (+0.3) | 0.180 (−2.6) | 27.32 (+0.00) |
| 0.24961 | 0.354 | 29.94 | 0.25000 (+0.2) | 0.340 (−3.9) | 29.93 (−0.00) |
| 0.49971 | 0.679 | 33.55 | 0.49963 (−0.0) | 0.627 (−7.6) | 33.54 (−0.01) |
| 0.99979 | 1.311 | 38.33 | 0.99989 (+0.0) | 1.089 (−17.0) | 38.31 (−0.03) |
| 1.99873 | 2.501 | 43.94 | 1.999651 (−0.1) | 1.772 (−29.1) | 43.91 (−0.02) |
| | | | Average (Bike, Café, Woman) | | |
| 0.06243 | 0.102 | 22.79 | 0.06243 (−0.0) | 0.098 (−3.8) | 22.78 (−0.01) |
| 0.12464 | 0.203 | 24.78 | 0.12478 (+0.1) | 0.194 (−4.3) | 24.76 (−0.01) |
| 0.24982 | 0.388 | 27.51 | 0.24995 (+0.1) | 0.365 (−5.9) | 27.49 (−0.02) |
| 0.49971 | 0.737 | 31.22 | 0.49984 (+0.1) | 0.667 (−9.6) | 31.17 (−0.05) |
| 0.99917 | 1.402 | 36.06 | 0.99962 (+0.0) | 1.170 (−16.5) | 35.99 (−0.08) |
| 1.99823 | 2.618 | 42.26 | 1.99861 (+0.0) | 1.849 (−29.4) | 42.17 (−0.08) |

To conclude this analysis, it is worthwhile comparing the lossless performance associated with the various different modifications and options which have been described hereinabove. Table 2, below, provides this comparison in terms of lossless bit-rate and total number of arithmetically coded symbols per sample, for five different algorithms. In particular, Table 2 indicates a comparison of lossless coding performance for five different algorithms (mode variations) using 64×64 code-blocks and 16×16 sub-blocks where applicable with the 5/3 default reversible Wavelet kernel. The first pair of columns refer to VM4; the second pair refer to a coder obtained by applying the modifications described up to and including the alternatives to quad-tree coding of sub-block significance; the third pair of columns is obtained by adding the parallel options ("-Crestart" and sub-block causal context formation); the fourth pair of columns are obtained by adding the "lazy" coding option; and the last pair of columns are obtained using the "option" coder from VM4 with "-Ccausal".

Some of the interesting points which can be observed from the above results are as follows:

(i) The "lazy" coding mode requires far fewer (usually less than half as many) symbols to be coded than any of the other modes.

(ii) The "lazy" coding mode generates a lower compressed bit-rate than that obtained with the same parallel options but the "lazy" mode turned off. Since the "lazy" mode affects only the significance propagation and magnitude refinement coding passes all of whose coding contexts are initialized to the MQ coder's standard initial state at the beginning of the "learning curve", this result indicates that the relevant distributions must be so close to uniform that emitting raw binary digits is more efficient than letting the arithmetic coder learn this uniform distribution.

(iii) The modifications to the original EBCOT algorithm described herein up to and including the alternatives to quad-tree coding of sub-block significance have negligible effect on lossless coding performance.

TABLE 2

| VM4 bpp | VM4 Syms | Mod bpp | Mod Syms | Par bpp | Par Syms | Lazy bpp | Lazy Syms | Option bpp | Option Syms |
|---|---|---|---|---|---|---|---|---|---|
| | | | | Lenna (512 × 512) | | | | | |
| 4.3024 | 4.87 | 4.3087 | 4.80 | 4.3344 | 4.80 | 4.3078 | 2.43 | 4.3553 | 5.16 |
| | | | | Aerial2 (2048 × 2048) | | | | | |
| 5.4502 | 5.88 | 5.4495 | 5.81 | 5.4700 | 5.81 | 5.3874 | 3.20 | 5.4793 | 6.02 |
| | | | | Bike (2048 × 2560) | | | | | |
| 4.5339 | 5.36 | 4.5373 | 5.27 | 4.5677 | 5.26 | 4.5667 | 2.37 | 4.5993 | 5.65 |
| | | | | Café (2048 × 2560) | | | | | |
| 5.3557 | 6.17 | 5.3598 | 6.07 | 5.3967 | 6.06 | 5.3527 | 2.59 | 5.4314 | 6.37 |
| | | | | Woman (2048 × 2560) | | | | | |
| 4.5158 | 5.11 | 4.5171 | 5.04 | 4.5429 | 5.04 | 4.5171 | 267 | 4.5758 | 5.38 |
| | | | | Average (Bike, Café, Woman) | | | | | |
| 4.8018 | 5.55 | 4.8047 | 5.46 | 4.8358 | 5.45 | 4.8122 | 2.54 | 4.8688 | 5.80 |

(iv) The "option" coder in VM4 codes slightly more symbols and compresses slightly less efficiently than all the other modes discussed.

CPU TIMES FOR VARIOUS MODES OF INTEREST

Experimental testing has also been performed with regard to CPU decoding times for each different bit-rate and each of the JPEG2000 images considered above for a number of algorithm modes. The CPU times were all obtained using a 400 MHz Pentium Pro™ computer, which is perhaps the most appropriate target platform for initial consumer applications of JPEG2000. To reduce the substantial jitter in CPU timing results, a loop was added into the implementation of "decode-block" which iterates five (5) times through the block decoding process between calls to the standard ANSI "C" library function, "clock( )", which was used to measure the CPU time. The same modification was made to the VM4.1 source code for both the "option" coder and the original EBCOT variation, so as to ensure that the results can be reliably compared. The CPU timing results were obtained with the latest version of the VM4.1 source code for comparisons with existing entropy coder options.

The CPU timing comparison results indicate the following conclusions:
(i) The described modifications to the EBCOT coder in VM4.1 yield improvements in software execution speed on the order of 15% with negligible loss in compression performance.
(ii) If 8×8 sub-blocks are used instead of 16×16, performance degrades very little while software execution speed increases by about 6% or 7% (more at lower bit-rates).
(iii) With 8×8 sub-blocks the modified EBCOT coder runs about 15% faster than the "option" coder in VM4.1, with slight improvements in compression performance, when operated in comparable modes.
(iv) The "lazy" coding option yields a further 10% improvement in software execution speed at moderate bit-rates, while introducing a slight loss in compression efficiency. At least in the case where the parallel options are enabled, the "lazy" coding option to the modified EBCOT coder yields almost identical compression performance to the "option" coder in VM4.1 with a speed-up of about 25%. The speed-up factor increases rapidly at very high bit-rates without any further loss in compression efficiency.

From the foregoing description and analysis of block entropy coding in an EBCOT coder, several conclusions may be drawn. Firstly, the modifications to the original EBCOT algorithm described above relating to "far" neighbours, reduction of coding passes per bit-plane, block transposition and skewed initialization have negligible effect on compression performance, while simplifying the implementation of the algorithm.

The alternative to quad-tree coding of sub-block significance described herein leads to very minor improvements in compression performance. However, unlike quad-tree coding, its coding efficiency does not rely upon the fact that the number of sub-blocks in the width and height of the code-block are both approximately equal to 2n for some integer, n. Thus, for elongated blocks the quad-tree technique could be expected to suffer in comparison.

The next described coder constructions relate to exploiting "microscopic parallelism" in hardware implementations, and perhaps also reducing the external memory consumption in some applications. Because these options can degrade performance somewhat they may not of interest in some applications. However, this form of coder construction can accomplish the same objectives as the existing "option" coder in VM4 while substantially reducing the number of symbols which must be coded, increasing execution speed of software implementations, and yielding somewhat higher compression performance.

The "lazy" coding construction described herein introduces the possibility of very substantial reductions in the number of symbols which must be coded at higher bit-rates and, especially, in lossless compression applications. Performance is degraded relatively little at moderate bit-rates and lossless compression is actually improved.

The foregoing detailed description of the present invention has been presented by way of example only, and it is contemplated that changes and modifications may be made by one of ordinary skill in the art, to the materials and arrangements of elements of the present invention without departing from the scope of the invention. For example, various specific items of equipment are described as suitable for use in the preferred embodiment, but of course other apparatus may equally be used and may be functionally equivalent for the purposes of carrying out the present invention.

I claim:
1. A method for compressing image data, comprising the steps of:

decomposing the image data into code-blocks of coefficients using a transform, each code-block comprising a plurality of bit-planes from a most significant bit-plane to a least significant bit-plane;

processing bit-planes of coefficient data in the code blocks in multiple coding passes to generate raw bit-plane data;

arithmetically coding a portion of raw bit-plane data to generate arithmetically coded data; and writing the arithmetically coded data and the raw bit-plane data not arithmetically coded directly into a bit-stream;

wherein raw bit-plane data generated during significance propagation and magnitude refinement coding passes for bit-planes $p<p_0-K$ is written directly into the bit-stream, wherein $p_0$ denotes the most significant bit-plane of a code block in which any sample therein becomes contextually significant during arithmetic coding and K is an integer parameter.

2. The method of claim 1, wherein K=3.
3. The method of claim 1, wherein the method for compressing image data is based on embedded block coding with optimized truncation and employs a wavelet transform.
4. The method of claim 1, wherein arithmetically coded data is interleaved with raw bit-plane data in the bit-stream.
5. A method for compressing image data, comprising the steps of:

decomposing the image data into code-blocks of coefficients using a transform, each code-block comprising a plurality of bit-planes from a most significant bit-plane to a least significant bit-plane;

processing bit-planes of coefficient data in the code blocks in multiple coding passes to generate raw bit-plane data;

arithmetically coding a portion of raw bit-plane data to generate arithmetically coded data; and writing the arithmetically coded data and the raw bit-plane data not arithmetically coded directly into a bit-stream;

wherein raw bit-plane data generated during a normalization coding pass for bit-planes $p<p_0-K$ is arithmetically coded before being written directly into the bit-stream, wherein $p_0$ denotes the most significant bit-plane of a code block in which any sample therein becomes contextually significant during arithmetic coding and K is an integer parameter.

6. The method of claim 5, wherein K=3.

7. The method of claim 5, wherein the method for compressing image data is based on embedded block coding with optimized truncation and employs a wavelet transform.

8. The method of claim 5, wherein arithmetically coded data is interleaved with raw bit-plane data in the bit-stream.

* * * * *